UNITED STATES PATENT OFFICE.

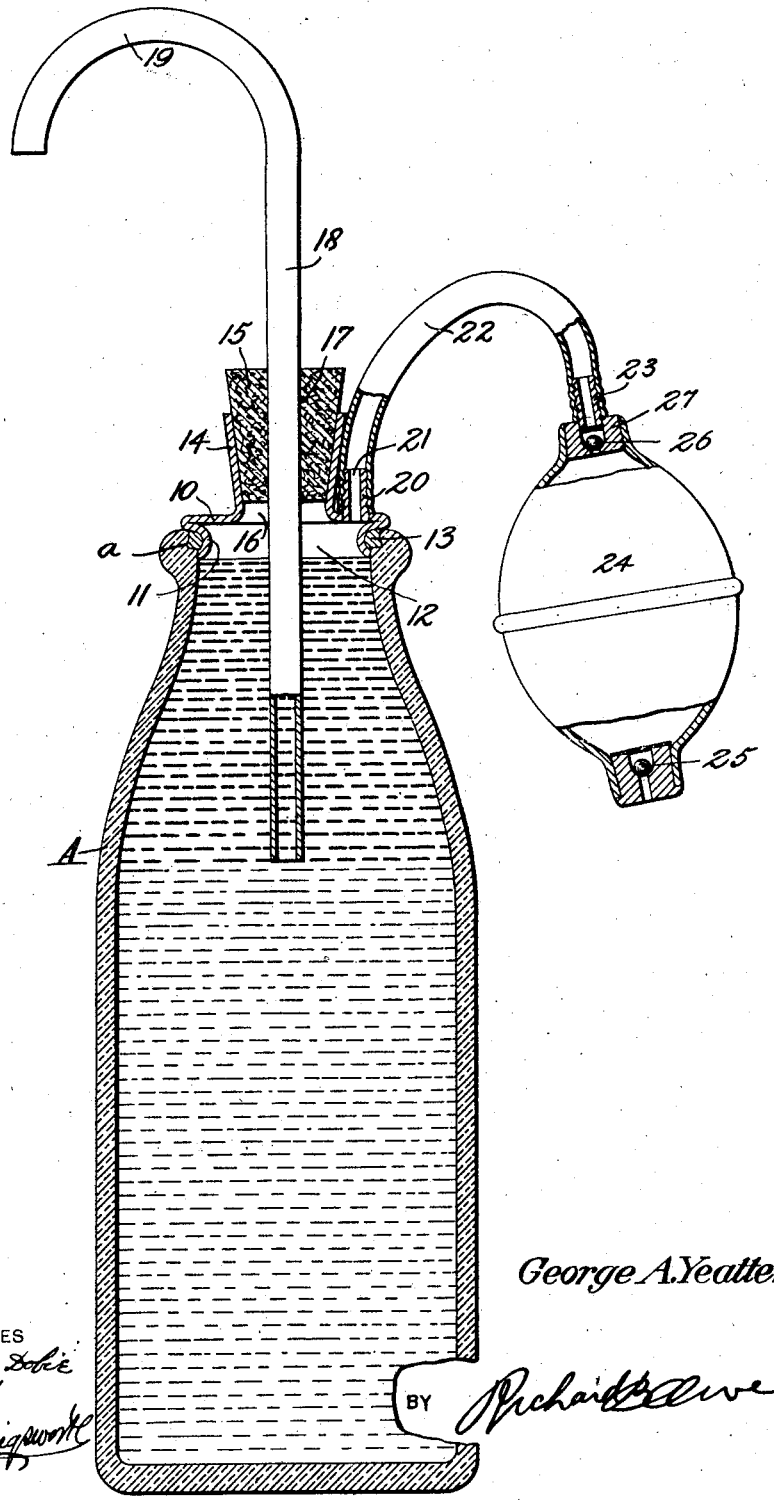

GEORGE A. YEATTER, OF MONROE, MICHIGAN.

CREAM-SEPARATOR.

1,328,866.         Specification of Letters Patent.    Patented Jan. 27, 1920.

Application filed November 15, 1916. Serial No. 131,493.

*To all whom it may concern:*

Be it known that I, GEORGE A. YEATTER, a citizen of the United States, residing at Monroe, in the county of Monroe and State of Michigan, have invented certain new and useful Improvements in Cream-Separators, of which the following is a specification.

This invention relates to cream separators, and has for its principal object to provide a simple and easily operated device that may be attached to the mouth of an ordinary and well known form of milk bottle and by means of atmospheric pressure force the cream from the surface of the milk and drive the same out of the bottle through a delivery tube.

Another object of the invention is to provide in a cream separator of the type set forth, means for attaching the same to the mouth of a bottle in an air tight manner and to mount in said means an escape tube for the cream that is readily adjustable and at the same time mounted in an air tight manner in the device.

Other objects of the invention not herein specifically stated will be set out in full in the following specification, pointed out particularly in the accompanying claim and illustrated in the drawings which shows a vertical sectional view of the device in position for use on a milk bottle.

In the drawings, A indicates a milk bottle of well known form having a relatively wide mouth and an internal shoulder *a* formed on the mouth to receive the usual paper closure with which milk bottles of this character are sealed.

The cream separator of the present invention comprises a closure 10 for the mouth of the bottle A made preferably of a disk of thin sheet metal flat on top and having its edge folded against the underside of the closure and then bent outwardly as at 11 to form an exterior concaved groove in the surface of the depending portion 12 of the closure. Within the aforesaid groove is placed a resilient ring 13 of such size as to fit snugly within the shouldered portion *a* of the bottle and form an air tight joint between the bottle and the closure 10.

Rising from the center of the closure 10 is a neck 14 tapering outward slightly as it rises and being of sufficient length to snugly seat a stopper 15 of cork, rubber or other compressible material. The neck 14 is preferably integral with the closure and may be formed by pressing the center of the disk outwardly, or securing the neck in place by soldering or welding as may be most expedient. The bore of the neck 14 communicates through the closure 10 as at 16 with the interior of the bottle.

Vertically through the center of the stopper 15 is an opening 17 in which is snugly fitted a tube 18 of glass, metal or other rigid material, said tube being movable longitudinally in the opening 17 but by reason of the tapered form of the stopper 15 and neck 14, said stopper is pressed air tight against the neck and the tube when forced downwardly into said neck. The tube 18 is preferably straight except at its upper end which may be curved as at 19 on a half circle to deliver the cream from the bottle A into a suitable receptacle for the same.

Secured to the closure 10 at one side of the neck 14 is an upright nipple 20 having a central perforation 21 that opens through the closure 10 and which may be corrugated on its outer surface to receive and hold in an air tight manner one end of a rudder or other flexible tube 22, the opposite end of which tube is connected to a hollow stem 23 on one end of a compressible bulb 24. The bulb 24 is of a type such as is used with syringes and has an inlet valve 25 at one end and an outlet valve 26 at the opposite end, the latter valve being within a casing 27 from which the stem 23 projects. The valves 25 and 26 are here shown as of ball type but may if desired be made in any other way that is most convenient and are mounted in their casing in such manner that compression of the bulb will force air in one direction only through the tube 22.

Constructed as described, the closure 10 is fitted in the mouth of the bottle A by seating the ring 13 in the shoulder *a* of the bottle and the tube 18 moved up or down in the stopper 15 as desired until its lower open end is at the line of separation between the milk and the cream within the bottle. The stopper 15 is then forced downwardly into the neck 14 to seal the tube 18 air tight. The bulb 24 is now compressed and air forced through the tube 22 into the top of the bottle, the pressure of said air upon the cream forcing the latter upwardly through the tube 18 and out of its upper end into a suitable receptacle. Air will be forced into the bottle until all of the cream has been discharged therefrom whereupon the device may be inserted in the mouth of another bottle and the operation repeated. By means of the separator just described, cream can be quickly and thoroughly removed from the surface of milk within bottles without agitating the cream or causing the milk and cream to become mixed during the process of separation. The device is simple, the parts few and easily disassembled for washing and cleaning and the device made thoroughly sanitary. It is to be noted that with careful manipulation only the tube 18 enters the cream although the compression ring 13 and the lower end 12 of the closure may have some cream reach their outer surfaces due to the fact that the bottles are more or less shaken while being transported and the cream is thrown against the sides of the bottle at the mouth and upon the shoulder $a$.

I claim:

In a device of the character described, the combination of a flat disk-like closure said closure having its outer periphery bent inwardly and then downwardly and outwardly, thus, forming a curved supporting flange, the lower edge of which is offset inwardly from the outer portion of the disk like closure, a yieldable ring carried by said flange, the outer surface of the ring extending outwardly beyond said flange, whereby the closure may rest upon a milk bottle with the ring engaging the channeled portion of the milk bottle and the flange extending into the milk bottle, an integral conical neck rising from the central portion of said closure, a tapering stopper removably inserted into said neck, a tube carried by said stopper, an upright nipple secured to said closure and rising contiguous to said neck, a flexible tube for fitting over said nipple, whereby the tube will be gripped between said nipple and neck to be held against accidental displacement and a pumping means connected to the outer end of said tube.

In testimony whereof I affix my signature in presence of two witnesses.

GEORGE A. YEATTER.

Witnesses:
FRANK NAGEL,
HENRY ATKINSON.